US012597711B2

(12) United States Patent
Koga

(10) Patent No.: US 12,597,711 B2
(45) Date of Patent: Apr. 7, 2026

(54) ANTENNA DEVICE AND WIRELESS TERMINAL

(71) Applicant: FCNT LLC, Yamato (JP)

(72) Inventor: Yohei Koga, Yamato (JP)

(73) Assignee: FCNT LLC, Yamato (JP)

( * ) Notice: Subject to any disclaimer, the term of this patent is extended or adjusted under 35 U.S.C. 154(b) by 289 days.

(21) Appl. No.: 18/118,838

(22) Filed: Mar. 8, 2023

(65) Prior Publication Data

US 2023/0291116 A1 Sep. 14, 2023

(30) Foreign Application Priority Data

Mar. 11, 2022 (JP) ................................ 2022-038260

(51) Int. Cl.
*H01Q 13/10* (2006.01)
*H01Q 1/24* (2006.01)
*H01Q 9/04* (2006.01)

(52) U.S. Cl.
CPC ......... *H01Q 13/106* (2013.01); *H01Q 9/0457* (2013.01); *H01Q 1/243* (2013.01)

(58) Field of Classification Search
CPC ..... H01Q 1/243; H01Q 9/0457; H01Q 13/106
See application file for complete search history.

(56) References Cited

U.S. PATENT DOCUMENTS 6,421,018 B1 * 7/2002 Zeilinger ............. H01Q 1/1285 343/713
6,452,554 B1 * 9/2002 Aoyama ................ H01Q 1/243 343/702
2008/0111753 A1 * 5/2008 Cheng ...................... H01Q 9/40 343/700 MS
2012/0007781 A1 1/2012 Kim et al.
2022/0393357 A1 12/2022 Itami et al.

FOREIGN PATENT DOCUMENTS

| | | | | |
|---|---|---|---|---|
| CN | 107959112 A | * | 4/2018 | ............... H01Q 1/38 |
| JP | 2000196344 A | * | 7/2000 | |
| JP | 2006-33069 A | | 2/2006 | |
| JP | 2010-136296 A | | 6/2010 | |
| JP | 2012-19503 A | | 1/2012 | |
| JP | 2013-532436 A | | 8/2013 | |
| JP | 2015-43542 A | | 3/2015 | |
| WO | 2011/159262 A1 | | 12/2011 | |
| WO | 2021/084705 A1 | | 5/2021 | |

* cited by examiner

*Primary Examiner* — Amal Patel
(74) *Attorney, Agent, or Firm* — WHDA, LLP

(57) ABSTRACT

An antenna device includes a metal layer for forming an antenna element in a predetermined planar shape and a ground arranged on a lower side of the metal layer. The metal layer forms a first metal forming the planar shape, a notch portion formed at the first metal, and cutting out a part of an edge of the planar shape, a second metal being an electromagnetic field coupling element arranged with a predetermined distance spaced from the first metal inside the notch portion, and a feeder line formed outside the planar shape, and to be connected with the second metal via an opening portion of the notch portion. For the second metal, a width at the opening portion is smaller than a maximum width at a portion more inside the notch portion than the opening portion.

10 Claims, 29 Drawing Sheets

FIG. 4

| BANDWIDTH (EFFICIENCY -4 dB) | | LENGTH OF W2 (mm) | | | | | | | | |
|---|---|---|---|---|---|---|---|---|---|---|
| | | 2.0 | 2.5 | 3.0 | 3.5 | 4.0 | 4.5 | 5.0 | 5.5 | 6.0 |
| LENGTH OF L2 (mm) | 1.0 | 90 | 100 | 120 | 120 | 130 | 140 | 60 | 0 | 0 |
| | 1.5 | 110 | 130 | 140 | 140 | 140 | 135 | 130 | 90 | 0 |
| | 2.0 | 130 | 135 | 140 | 135 | 135 | 130 | 100 | 80 | 0 |
| | 2.5 | 110 | 120 | 130 | 160 | 110 | 90 | 60 | 0 | 0 |
| | 3.0 | 120 | 125 | 110 | 80 | 50 | 0 | 0 | 0 | 0 |
| | 3.5 | 110 | 110 | 70 | 60 | 0 | 0 | 0 | 0 | 0 |

ANTENNA DEVICE AND WIRELESS TERMINAL

CROSS-REFERENCE TO RELATED APPLICATION

This application is based upon and claims the benefit of priority of the prior Japanese Patent Application No. 2022-038260, filed on Mar. 11, 2022, the entire contents of which are incorporated herein by reference.

FIELD

The embodiments discussed herein are related to an antenna device and a wireless terminal.

BACKGROUND

For a wireless terminal, various antennas have been used (see Patent Document 1-5).

[Patent Document 1] Japanese Laid-open Patent Publication No. 2010-136296

[Patent Document 2] Japanese Laid-open Patent Publication No. 2012-19503

[Patent Document 3] Japanese Laid-open Patent Publication No. 2015-043542

[Patent Document 4] Japanese Laid-open Patent Publication No. 2006-033069

[Patent Document 5] Japanese National Publication of International Patent Application No. 2013-532436

SUMMARY

According to an aspect of the embodiments, An antenna device includes a metal layer for forming an antenna element in a predetermined planar shape; and a ground arranged on a lower side of the metal layer, wherein the metal layer forms: a first metal forming the planar shape, a notch portion formed at the first metal, and cutting out a part of an edge of the planar shape, a second metal being an electromagnetic field coupling element arranged with a predetermined distance spaced from the first metal inside the notch portion, and a feeder line formed outside the planar shape, and to be connected with the second metal via an opening portion of the notch portion, and for the second metal, a width at the opening portion is smaller than a maximum width at a portion more inside the notch portion than the opening portion.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 4 is a table showing the verification results of the bandwidth;

DESCRIPTION OF EMBODIMENTS

As one example of a thin type antenna, a patch antenna is known. The patch antenna is preferable for, for example, the case where a plurality of arrays thereof are desired to be provided. However, the patch antenna has a relatively narrow band.

It is an object of one aspect of the disclosed technology to enable broadening of the band of the patch antenna.

Embodiment

The configuration of the embodiment shown below is illustrative, and the disclosed technology is not limited to the configuration of the embodiment.

The antenna device in accordance with an embodiment includes, for example, the following configuration. Namely, the antenna device includes a metal layer for forming an antenna element in a predetermined planar shape, and a ground to be arranged on the lower side of the metal layer. The metal layer forms: a first metal forming the planar shape; a notch portion formed at the first metal, and cutting out a part of an edge of the planar shape; a second metal being an electromagnetic field coupling element arranged with a predetermined distance spaced from the first metal inside the notch portion; and a feeder line formed outside the planar shape, and to be connected with the second metal via an opening portion of the notch portion. For the second metal, a width at the opening portion is smaller than a maximum width at a portion more inside the notch portion than the opening portion.

The antenna device enables broadening of the band. Further, the antenna device can be mounted on, for example, a wireless terminal. As the wireless terminals, mention may be made of a smartphone, a tablet terminal, a wearable computer, a cellular phone, a notebook type personal computer, and the like.

Embodiment

Figure 1:
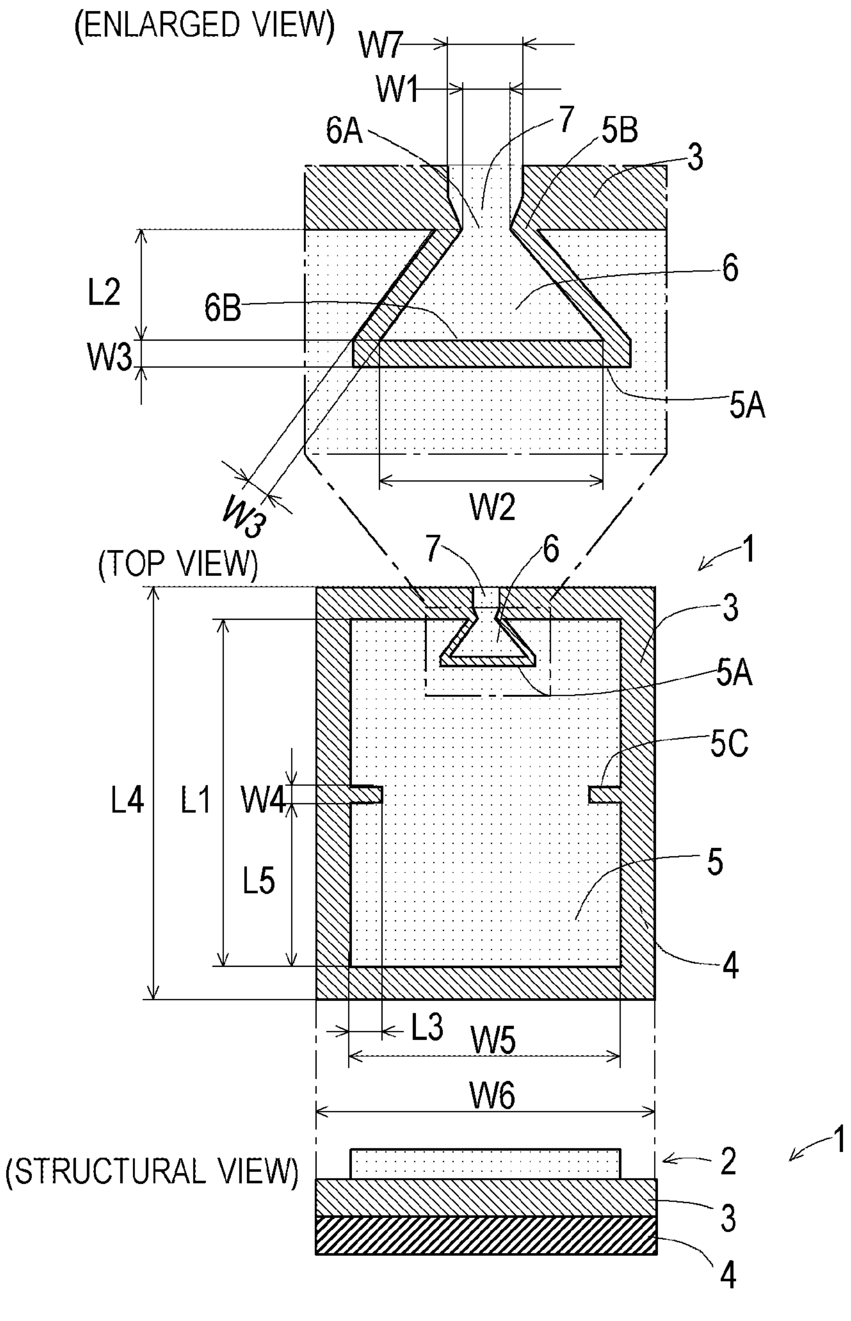
FIG. 1 is a view showing an antenna device in accordance with an embodiment.

Below, the details of the antenna device will be described. FIG. 1 is a view showing an antenna device in accordance with an embodiment. FIG. 1 shows the aspect in the shape of a rectangle in the overall view in order to show the outward appearance of an antenna device 1. However, the antenna device 1 is not limited to the aspect exhibiting such an outward appearance. The antenna device 1 may be a part of the wiring substrate of an electronic circuit for controlling various processing, or may be a part of other members. The wiring substrate may be a hard rigid substrate, or may be a bendable flexible substrate.

The antenna device 1 includes a ground 4, a dielectric layer 3 stacked on the ground 4, and a metal layer 2 stacked on the dielectric layer 3. The metal layer 2 is a metal layer forming a planar-shaped antenna element, and forms a first metal 5, a second metal 6, and a feeder line 7. Namely, the metal layer 2 forms a patch antenna including the first metal 5 and the second metal 6. Examples of the metal layer 2 may include a layer of copper foil.

The first metal 5 is a metal layer formed in a substantially overall rectangular planar shape. The first metal 5 functions as a radiating element for radiating a radio wave with a predetermined designed frequency band. The first metal 5 has a notch portion 5A cutting out a part of an edge in the vicinity of the central part of one short side of the two short sides present at the edge in a rectangular planar shape. Further, the first metal 5 has a slit 5C in such a form as to cut out a part of the edge in the vicinity of each central part of the two long sides present at the edge in a rectangular planar shape. The slit 5C is formed, for example, for adjusting the frequency.

The second metal 6 is a metal layer forming an overall trapezoid planar shape. The second metal 6 is arranged with a predetermined distance (W3) spaced from the first metal 5 in the inside of the notch portion 5A. The second metal 6 functions as an electromagnetic field coupling element for feeding a harmonic signal to the first metal 5.

The feeder line 7 is a metal layer formed outside the substantially rectangular planar shape formed by the first metal 5, and to be connected to the second metal 6 via an opening portion 5B of the notch portion 5*k* The feeder line 7 directly feeds a harmonic signal to the second metal 6.

Incidentally, the second metal 6 formed in an overall trapezoid planar shape is connected at the beginning end portion 6A of the portion corresponding to the top side of the trapezoid with the feeder line 7. Then, the second metal 6 has the minimum width (W1) at the portion of the beginning end portion 6A, gradually widens from the opening portion 5B toward the inside of the notch portion 5A, and has the maximum width (W2) at the terminal portion 6B corresponding to the bottom side of the trapezoid. Then, the notch portion 5A is in the shape adapted to the second metal 6 in such a form. Accordingly, the notch portion 5A cutting out the edge of the first metal 5 is a notch in the form gradually expanding toward the central part of the first metal 5 from the outer edge portion of the first metal 5 forming the substantially rectangular planar shape. Further, the first metal 5 is smaller at the width at the opening portion 5B than the maximum width of the notch portion 5A at the portion more inside the notch portion 5A than the opening portion 5B.

Further, in the first metal 5, the length (L1) of the portion from one side on which the second metal 6 is present to the other side, in other words, the length in the longitudinal direction (L1) is the length according to a predetermined designed frequency band radiated from the first metal 5. Then, the first metal 5 is in a form having a slit 5C with a predetermined width (W4) in the vicinity of the central part of each long side thereof.

With the antenna device 1 in such a form, the harmonic signal fed from the feeder line 7 to the second metal 6 is transmitted to the first metal 5 by the electromagnetic field coupling between the second metal 6 and the first metal 5. Then, a radio wave is radiated from the first metal 5.

Verification by Simulation

The antenna device 1 of the embodiment enables more broadening of the band than the patch antenna in the form in which the second metal 6 does not widen in the notch portion 5A. The effects due to widening of the second metal 6 in the notch portion 5A was verified by an electromagnetic field simulator, and hence the verification contents will be described below. In the following verification, the design frequency is set at 7.5 GHz.

Figure 2:
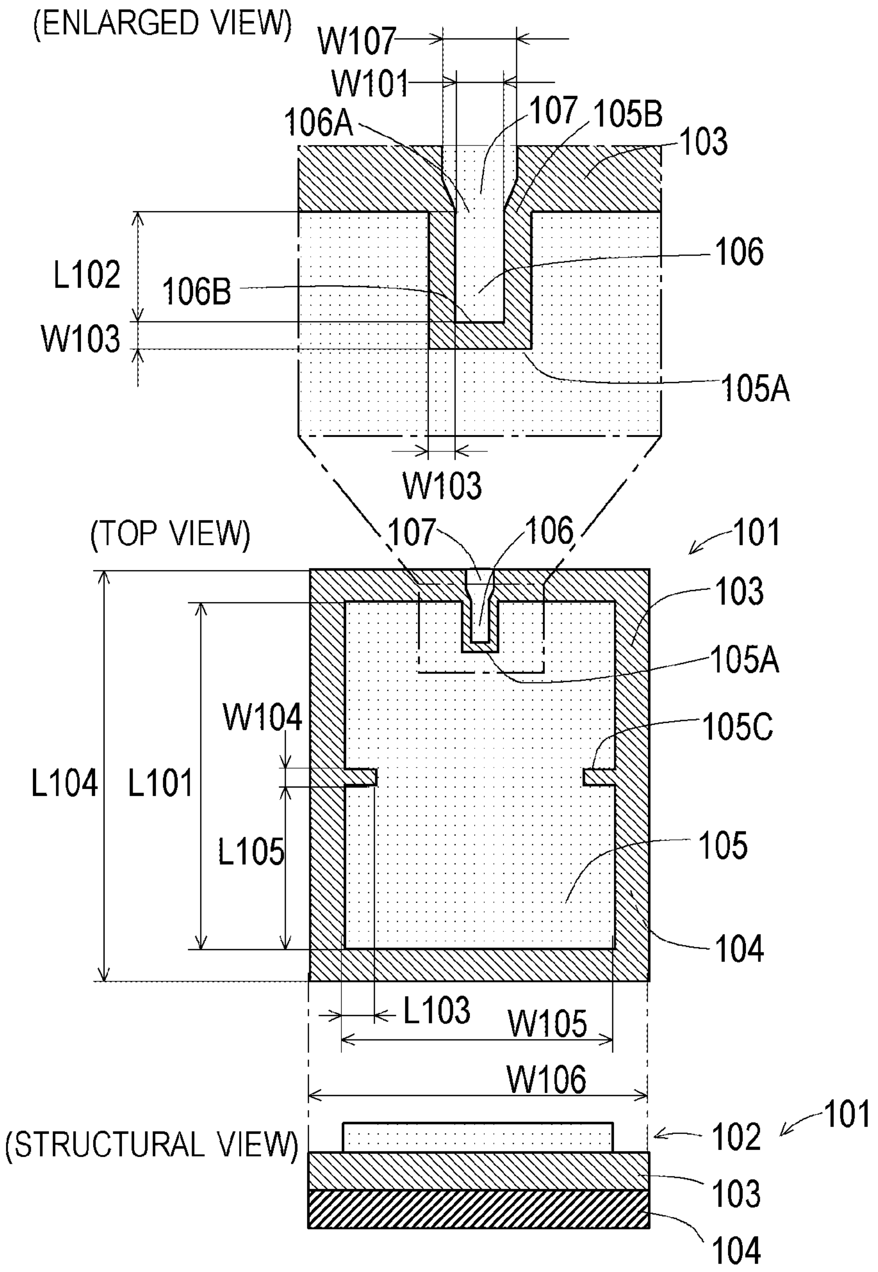
FIG. 2 is a view showing an antenna device in accordance with a comparative example.

In the present verification, the form in which the second metal 6 of the antenna device 1 in accordance with the present embodiment does not widen in the notch portion 5A was prepared as a comparative example. FIG. 2 is a view showing an antenna device in accordance with a comparative example.

An antenna device 101 in accordance with a comparative example includes, as with the antenna device 1 in accordance with the embodiment, a ground 104, a dielectric layer 103 stacked on the ground 104, and a metal layer 102 stacked on the dielectric layer 103. The metal layer 102 is a metal layer forming an antenna element in a planar shape, and forms a first metal 105, a second metal 106, and a feeder line 107.

The first metal 105 is a metal layer forming an overall substantially rectangular planar shape as with the first metal 5. Then, the first metal 105 has a notch portion 105A and a slit 105C.

The second metal 106 is a metal layer to be arranged with a predetermined distance (W103) spaced from the first metal 105 inside the notch portion 105A as with the second metal 6. Then, the second metal 106 functions as an electromagnetic field coupling element for feeding a harmonic signal to the first metal 105. However, the second metal 106 forms a rectangular planar shape in an overall view having a constant width from the beginning end portion 106A to the terminal portion 106B as distinct from the second metal 6. The second metal 106 is connected at the portion of the beginning end portion 106A with the feeder line 107, so that a harmonic signal is directly fed from the feeder line 107.

Figure 3:
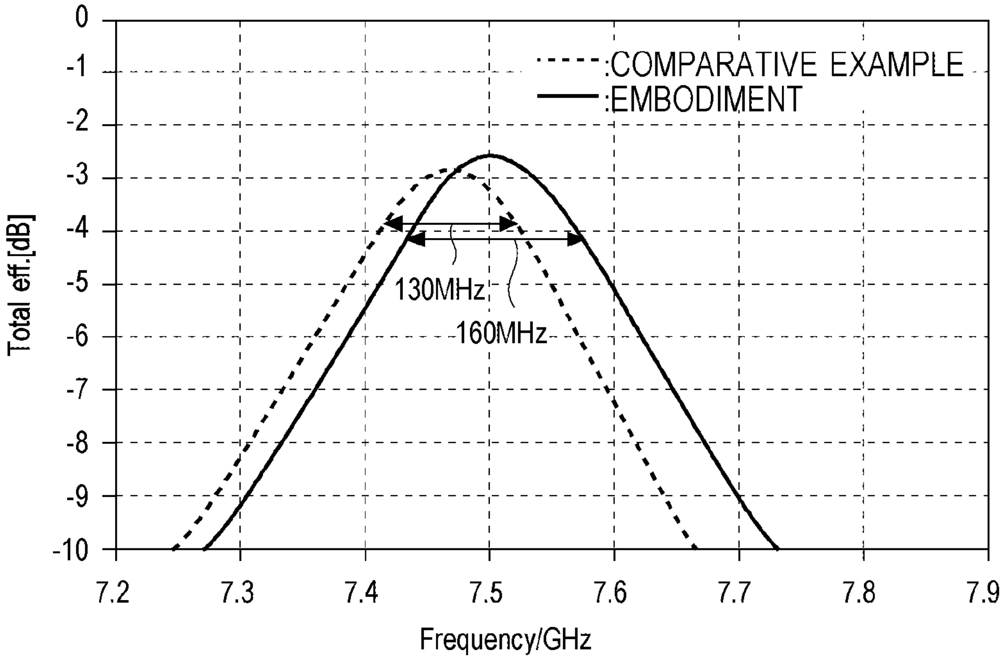
FIG. 3 is a graph showing the comparison results of the bandwidths.

In the present simulation, such an antenna device 101 is prepared as a comparative example, thereby performing comparison with the antenna device 1 in accordance with the embodiment. FIG. 3 is a graph showing the comparison results of the bandwidth. In the graph of FIG. 3, attention is paid to the bandwidth resulting in an efficiency of −4 dB or more. In the present simulation, the antenna device 1 and the antenna device 101 with dimensions of respective parts set under the following conditions are simulated.

Setting Conditions

W1, W101 (mm)=0.50
W2 (mm)=3.50
W3, W103 (mm)=0.25
W4, W104 (mm)=0.50
W5, W105 (mm)=8.00
W6, W106 (mm)=10.00
W7, W107 (mm)=0.90
L1, L101 (mm)=10.00
L2 (mm)=2.50
L102 (mm)=3.00
L3, L103 (mm)=1.00
L4, L104 (mm)=12.00
L5, L105 (mm)=4.75
Relative dielectric constant of dielectric layer=3.4
Dielectric loss at dielectric layer=0.002

As indicated from the graph of FIG. 3, while the bandwidth resulting in an efficiency of −4 dB was 130 MHz for the antenna device 101 in accordance with the comparative example, it was 160 MHz for the antenna device 1 in accordance with the embodiment. Accordingly, the antenna device 1 in accordance with the embodiment can be said to enable broadening of the band of about 23% at maximum as compared with the antenna device 101 in accordance with the comparative example.

Further, in order to confirm the dimensional requirements capable of providing a bandwidth equal to or more than the bandwidth (130 MHz) of the bandwidth of the antenna device 101 in accordance with the comparative example, verification was also performed on the band width resulting in an efficiency of −4 dB when the W2 was changed in increments of 0.50 mm within the range of 2.00 mm to 6.00 mm, and when L2 was changed in increments of 0.50 mm within the range of 1.00 mm to 3.50 mm. FIG. 4 is the table showing the verification results of the bandwidth.

As shown in the table of FIG. 4, it can be said that the bandwidth resulting in an efficiency of −4 dB becomes 130 MHz or more generally when W2 falls within the range of 2.00 mm to 5.00 mm, and L2 falls within the range of 1.00 mm to 2.50 mm, as indicated with the gray display in the table. Then, it can be said that the bandwidth resulting in an efficiency of −4 dB becomes larger than 130 MHz generally when W2 falls within the range of 2.50 mm to 4.50 mm, and L2 falls within the range of 1.00 mm to 2.50 mm. Further, it can be said that the bandwidth resulting in an efficiency of −4 dB becomes maximum when W2 is 3.50 mm, and L2 is 2.50 mm.

Figure 5:
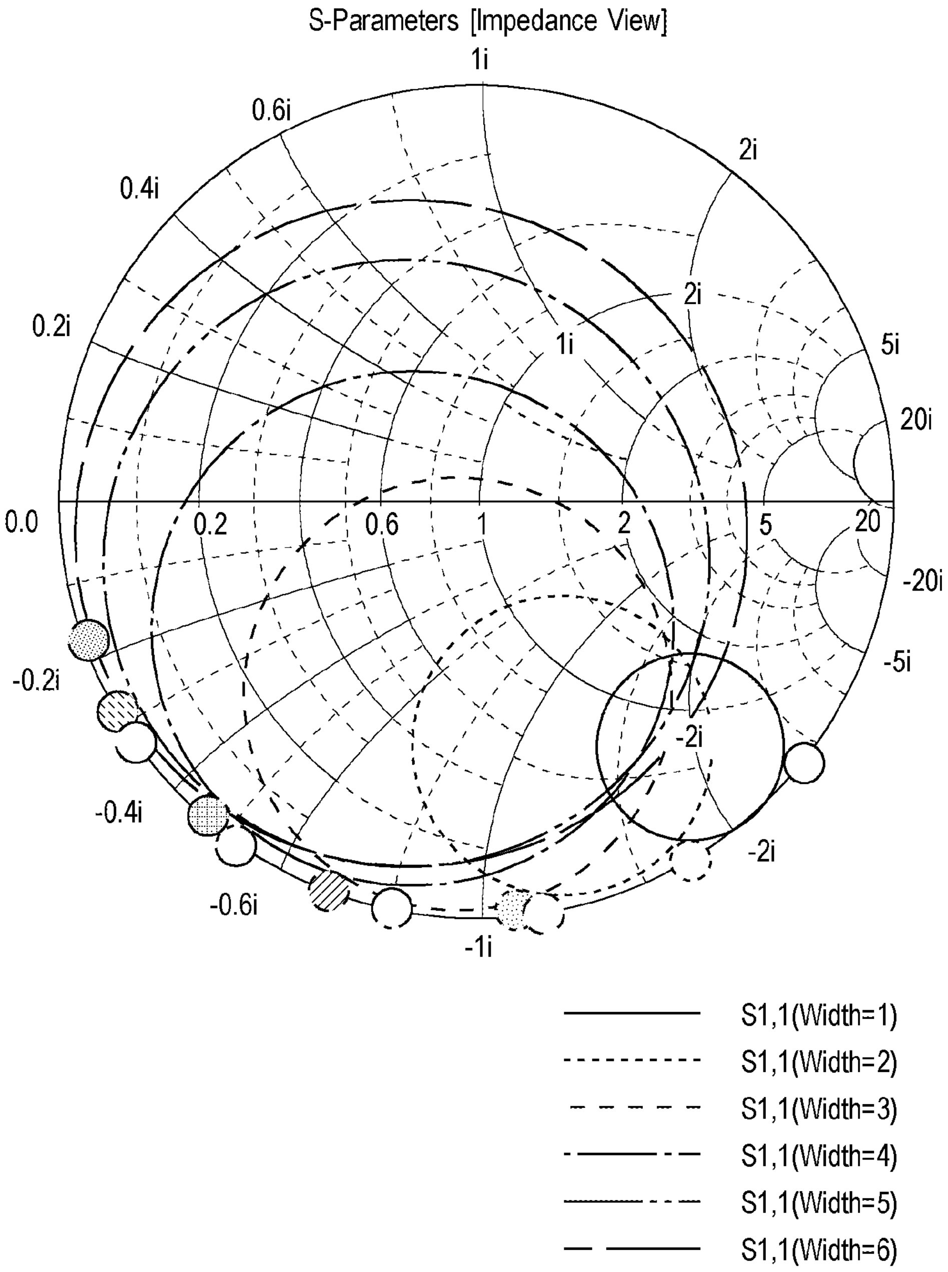
FIG. 5 is a view showing the comparison results of the S parameter (Smith chart)
Figure 6:
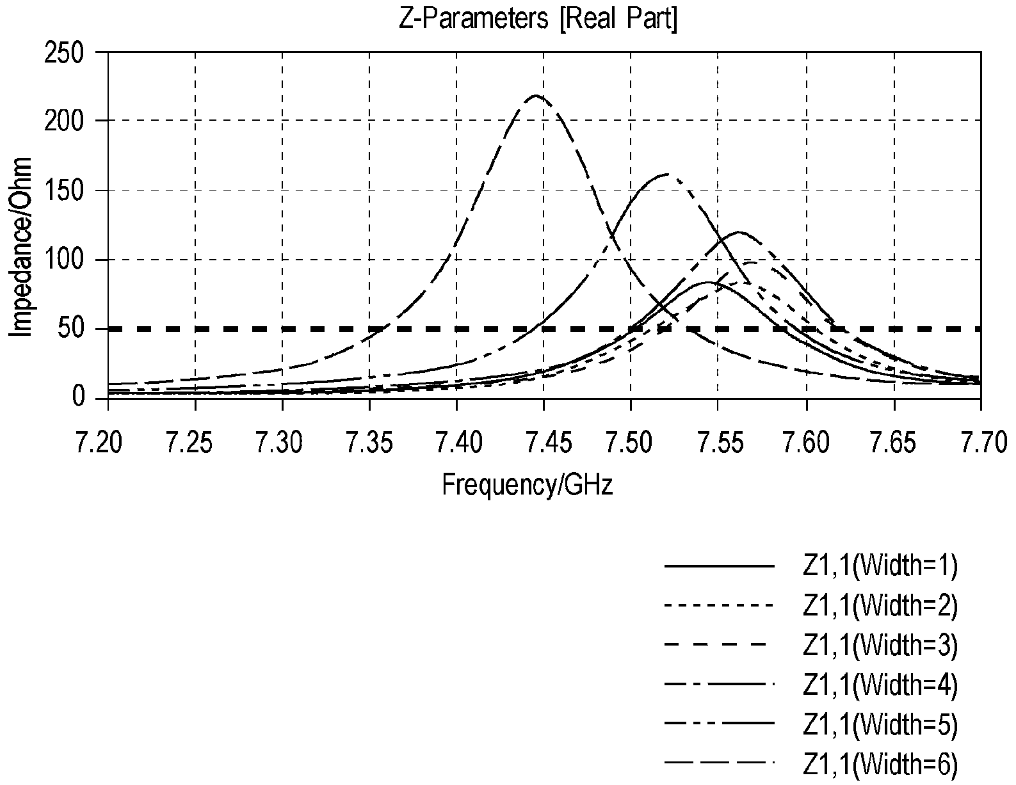
FIG. 6 is a view showing the comparison results of the Z parameter (real part)
Figure 7:
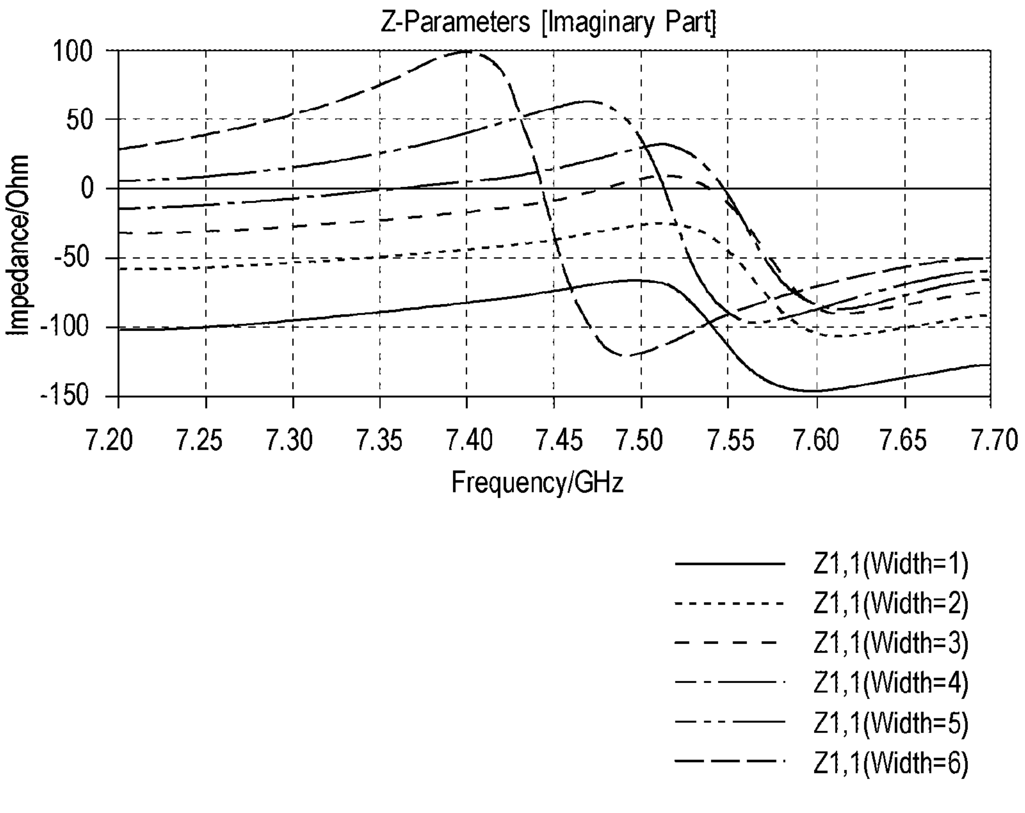
FIG. 7 is a view showing the comparison results of the Z parameter imaginary part)

FIG. 5 is a view showing the comparison results of the S parameter (Smith chart). Further, FIG. 6 is a view showing the comparison results of the Z parameter (real part). Furthermore, FIG. 7 is a view showing the comparison results of the Z parameter (imaginary part). Each drawing of FIGS. 5 to 7 shows the parameter when W2 has been changed in increments of 1.0 mm within the range of 1.0 mm to 6.0 mm. FIG. 6 shows those on the basis of the characteristic impedance of 50Ω.

As indicated from FIG. 6, it is understood that the resistance component increases with an increase in W2. Further, as can be seen by focusing on the portion of 7.5 GHz in the graph of FIG. 7, it is understood that the inductance component approaches 0Ω with an increase in W2 when W2 falls within the range of 1.0 mm to 5.0 mm. Accordingly, it is understood as follows: by adjusting W2 to an appropriate size, it is possible to make the antenna device 1 an antenna having proper resistance component and inductance component.

Figure 8:
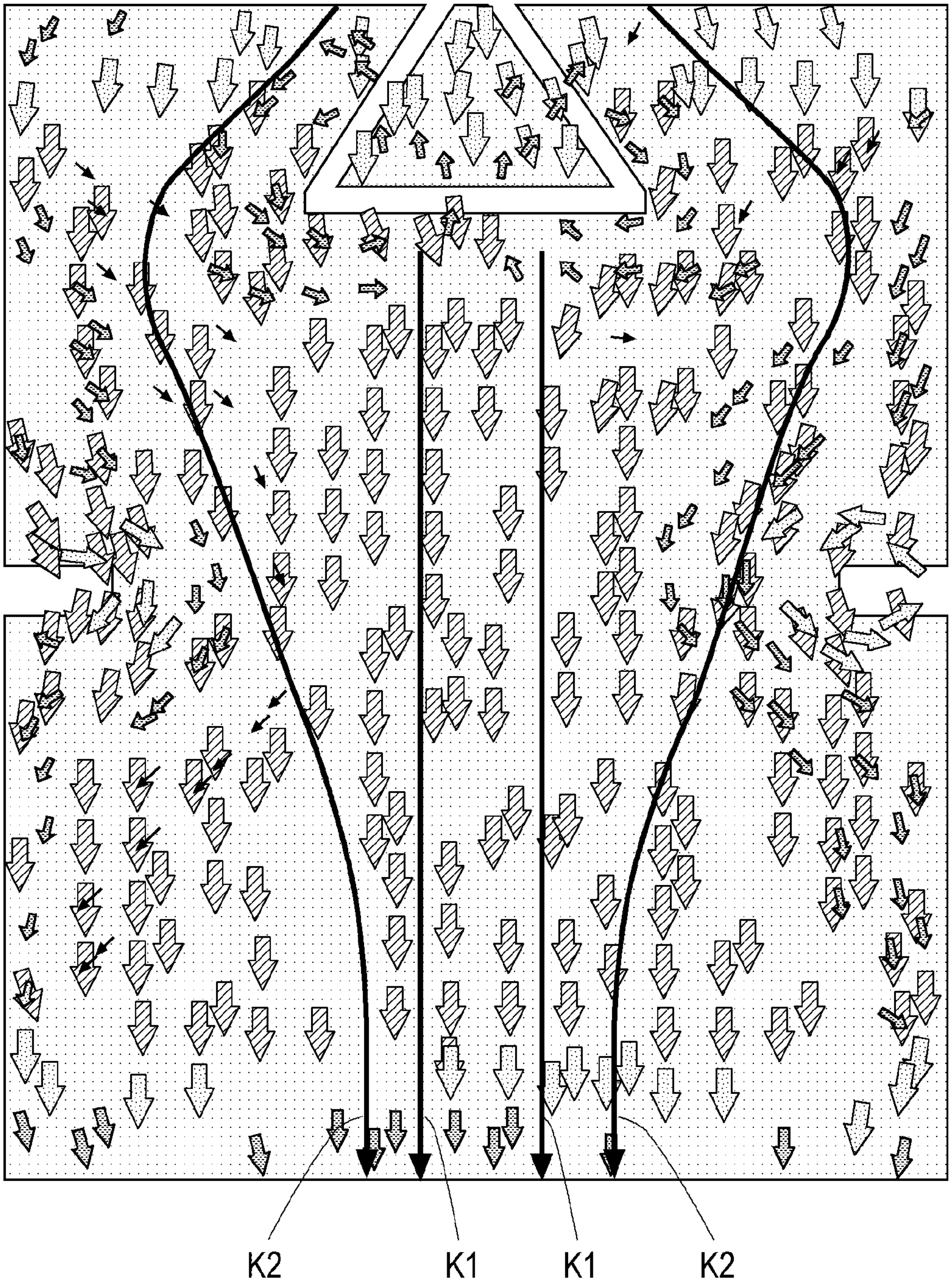
FIG. 8 is an image view representing the current distribution at the antenna device.

FIG. 8 is an image view illustrating the current distribution at the antenna device 1. The small block arrow shown in FIG. 8 indicates the simulation results of the current distribution. Further, the thick-line arrows (K1 and K2) shown in FIG. 8 show the tendency of the overall current distribution read from the simulation results. As indicated by seeing the thick-line arrows shown in FIG. 8, at the antenna device 1, other than a current path K1 going straight from the notch portion 5A in which the second metal 6 is arranged in the longitudinal direction of the first metal 5 (the downward direction in FIG. 8), there is additionally a current path K2 gradually going in the longitudinal direction while rather going from the notch portion 5A in the lateral direction of the first metal 5 (the left/right direction in FIG. 8). For simplification of the description, below, a description will be given by focusing on two of the current path K1 and the current path K2. The actual current paths generated at the antenna device 1 cannot be thus clearly distinguished from each other. For the antenna device 1, the current paths beginning to go from the site of the first metal 5 at which the notch portion 5A is present are innumerably present.

The current path K1 is the path going straight from the notch portion 5A in the longitudinal direction of the first metal 5, and hence can be said to be the shortest current path of the first metal 5. In contrast, the current path K2 is the path gradually going in the longitudinal direction while rather going in the lateral direction of the first metal 5 from the notch portion 5A, and hence can be said to be a longer current path than the current path K1. Then, it is obvious from the viewpoint of the structure that the length of the current path K2 increases with an increase in length of W2.

For the antenna device 1 in accordance with the embodiment, the inductance component can more approach 0Ω than with the antenna device 101 of the comparative example. This can be considered due to the fact that such a current path having a long path as the current path K2 is generated. Further, the antenna device 1 in accordance with the embodiment can more broaden the band than the antenna device 101 of the comparative example. This can be considered due to the fact that the current path K2 having a long path is generated other than the current path K1 having a short path. Accordingly, it can be said as follows: the width (W1) at the opening portion 5B of the second metal 6 is set smaller than the maximum width (W2) of the second metal 6 at the portion more inside the notch portion 5A than the opening portion 5B; accordingly, the current generated at the first metal 5 in the vicinity of the opening portion 5B goes in the lateral direction of the first metal 5; thus, other than the current path K1 having a short path, the current path K2 having a long path is generated at the first metal 5; as a result, the antenna device 1 provides more broadening of the band than the antenna device 101.

Then, in the present verification, the design frequency is assumed to be 7.5 GHz, and the width (W1) at the opening portion 5B of the second metal 6 is assumed to be 0.50 mm. Accordingly, as the conditional expression of the width (W1), for example, the following expression (1) can be derived:

$$W1 \leq 0.0125\lambda \quad (1)$$

where λ(mm) represents a wavelength at a specific design frequency.

Further, in view of the verification results of the bandwidth shown in FIG. 4, as the conditional expression of the maximum width (W2) of the second metal 6 at the portion more inside the notch portion 5A than the opening portion 5B, for example, the following expression (2) can be derived:

$$W2 \leq 0.125\lambda \quad (2)$$

Further, in view of the verification results of the bandwidth shown in FIG. 4, as the conditional expression of the length (L2) from the opening portion 5B to the opposite side to the opening portion 5B, for example, the following expression (3) can be derived:

$$L2 \leq 0.0625\lambda \quad (3)$$

Figure 9:
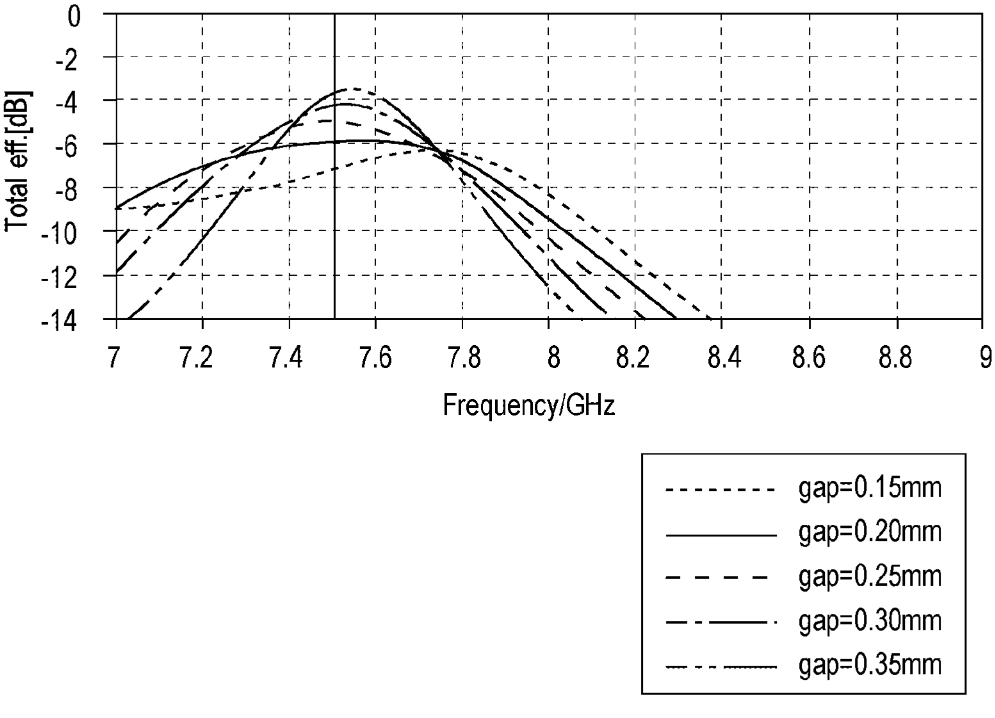
FIG. 9 is a graph showing the total efficiency when the interval between a first metal and a second metal has been changed.

Incidentally, for actually manufacturing the antenna device 1, the distance (W3) between the first metal 5 and the second metal 6 may vary according to the precision of etching, or the like. For this reason, a simulation verification was also performed for the case where the distance (W3) has been changed. FIG. 9 is a graph showing the total efficiency when the distance between the first metal 5 and the second metal 6 has been changed. FIG. 9 shows the total efficiency when for the antenna device 1 according to the foregoing "setting conditions", W3 has been changed in increments of 0.05 mm within the range of 0.15 mm to 0.35 mm. As indicated by focusing on the vicinity of 7.5 GHz in the graph of FIG. 9, it is indicated as follows: in the case where the W3 by design is 0.25 mm, even when the actual W3 has an error of about ±0.05 mm, the peak efficiency changes only by about ±0.8 dB. A change in peak efficiency to this extent is the same degree as that of the measurement error of a measuring machine for measuring the electric field strength of an actual machine. Further, also for actually manufacturing the antenna device 1, it is very unlikely that such an error in manufacturing as to make W3 larger than the design value by ±0.05 mm is caused. Therefore, it can be said that even slight variation in the distance (W3) between the first metal 5 and the second metal 6 during manufacturing of the antenna device 1 does not affect the performances of the antenna device 1.

Modified Example

Figure 10:
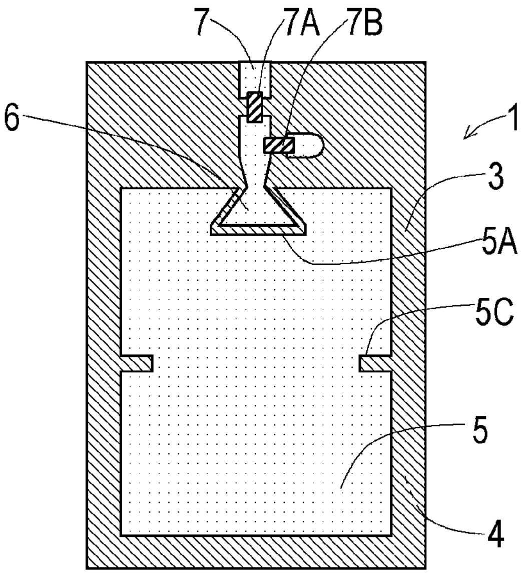
FIG. 10 is a view showing an antenna device to which a matching circuit has been added.
Figure 11:
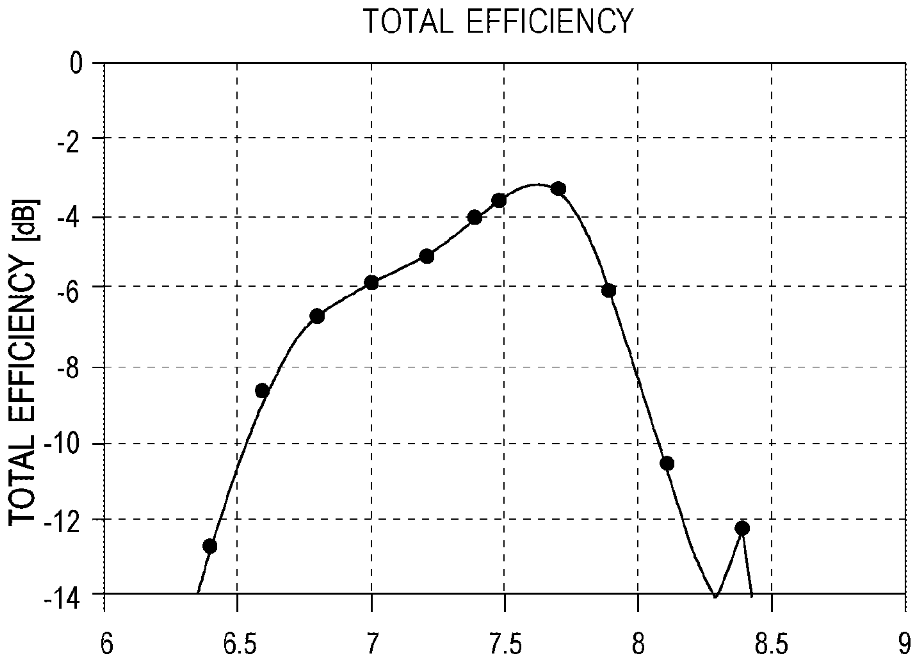
FIG. 11 is a graph showing one example of the total efficiency of an antenna device to which a matching circuit has been added.

Incidentally, the antenna device 1 in accordance with the embodiment may be provided with, for example, a matching circuit. FIG. 10 is a view of the antenna device 1 including a matching circuit added therein. Further, FIG. 11 is a graph showing one example of the total efficiency of the antenna device 1 including a matching circuit added therein. To the antenna device 1, for example, as shown in FIG. 10, matching circuits 7A and 7B may be added to the feeder line 7. Use of the matching circuits 7A and 7B can take the impedance matching with more ease than by changing the antenna shape of the antenna device 1.

Figure 12A:
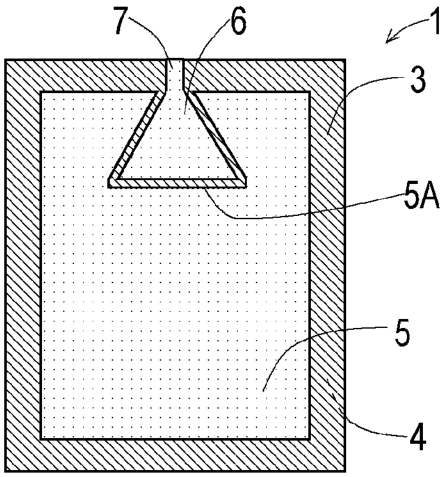
FIG. 12A is a view showing the variation regarding the shape of the first metal.
Figure 12B:
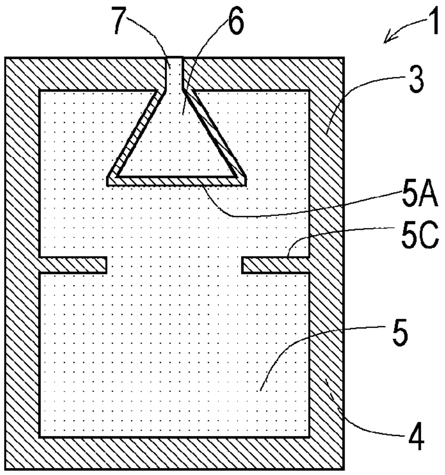
FIG. 12B is a view showing the variation regarding the shape of the first metal.
Figure 12C:
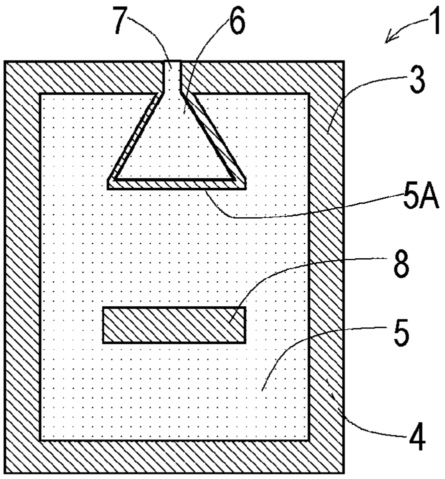
FIG. 12C is a view showing the variation regarding the shape of the first metal.
Figure 12D:
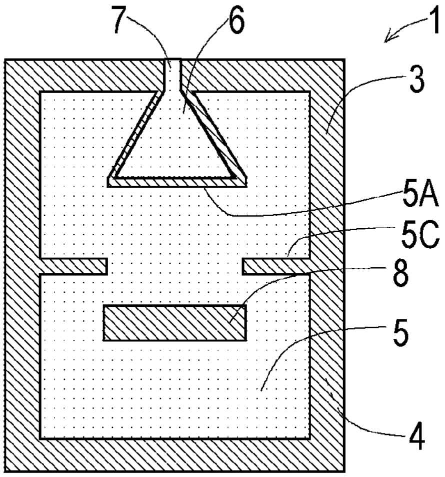
FIG. 12D is a view showing the variation regarding the shape of the first metal.

Further, the shape of the first metal 5 may be deformed in the following manner. FIGS. 12A to 12D are each a view showing the variation in shape of the first metal 5. FIG. 12A shows the antenna device 1 in which the slit 5C has been omitted from the first metal 5. Further, FIG. 12B shows the antenna device 1 in which the slit 5C has been made longer than that of the embodiment. Furthermore, FIG. 12C shows the antenna device 1 in which a slit 8 penetrating through the first metal 5 is provided in the vicinity of the central part of the first metal 5 in place of omitting the slit 5C from the first metal 5. Still further, FIG. 12D shows the antenna device 1 in which the slit 5C has been made longer than that of the embodiment, and further, a slit 8 penetrating through the first metal 5 is provided in the vicinity of the central part of the first metal 5. When the shape of the first metal 5 is thus deformed, the length of the current path K1 and the length of the current path K2 change from those of the embodiment. For this reason, it becomes possible to more broaden or narrow the bandwidth.

Figure 13A:
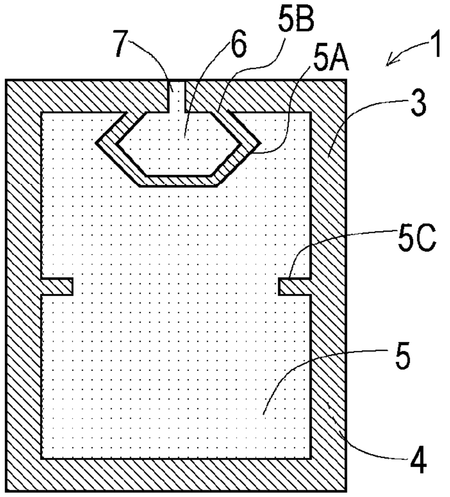
FIG. 13A is a view showing the variation regarding the shape of the second metal.
Figure 13B:
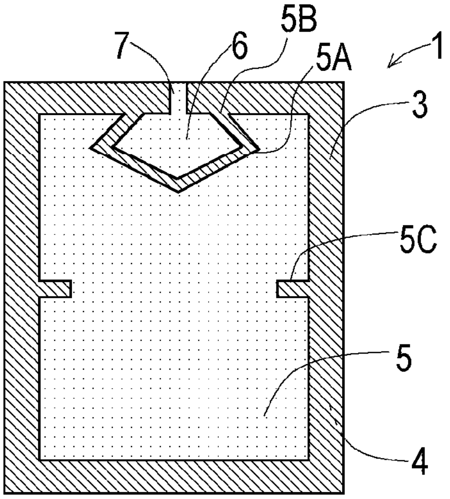
FIG. 13B is a view showing the variation regarding the shape of the second metal.
Figure 13C:
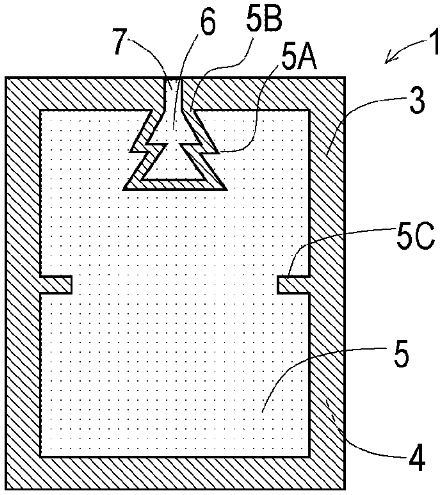
FIG. 13C is a view showing the variation regarding the shape of the second metal.
Figure 13D:
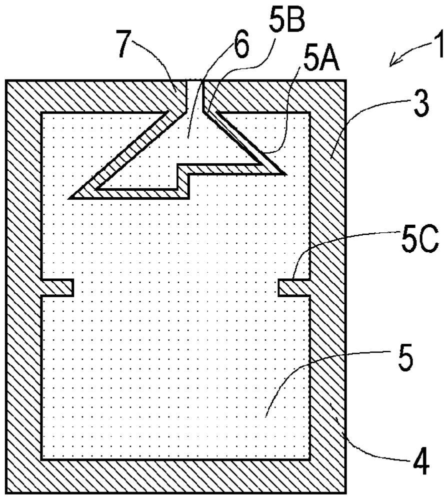
FIG. 13D is a view showing the variation regarding the shape of the second metal.
Figure 13E:
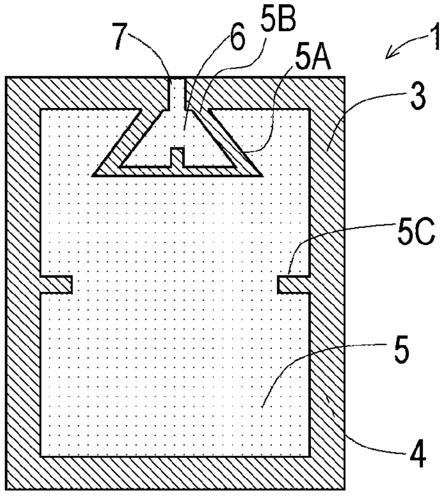
FIG. 13E is a view showing the variation regarding the shape of the second metal.
Figure 13F:
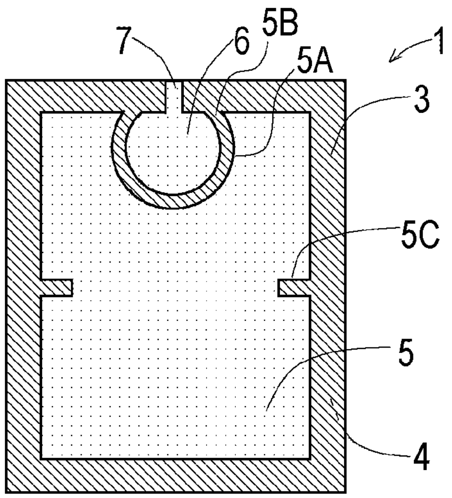
FIG. 13F is a view showing the variation regarding the shape of the second metal.

Further, the shape of the second metal 6 may be deformed, for example, in the following manner. FIGS. 13A to 13F are each a view showing the variation in shape of the second metal 6. FIG. 13A shows the antenna device 1 in which the second metal 6 has been deformed into a hexagon. Further, FIG. 13B shows the antenna device 1 in which the second metal 6 has been deformed into a pentagon. Still further, FIG. 13C shows the antenna device 1 in which the second metal 6 has been deformed into such a form that two trapezoids are connected. Furthermore, FIG. 13D shows the antenna device 1 in which the second metal 6 has been deformed into such a form as a partially chipped triangle. Furthermore, FIG. 13E shows the antenna device 1 in which the second metal 6 has been deformed into such a form that the bottom side is provided with a partial notch. Further, FIG. 13F shows the antenna device 1 in which the second metal 6 has been deformed into a circle. For all the second metals 6 in accordance with the modified examples, the width at the opening portion 5B is smaller than the maximum width at the portion more inside the notch portion 5A than the opening portion 5B. Accordingly, all of the antenna devices 1 in each of which the second metal 6 has been deformed generate such current paths as to be equivalent to the current path K1 and the current path K2 shown in the embodiment, and provide more broadening of the band than the antenna device 101 in accordance with the comparative example. With the modified examples, it can be considered as follows: for example, when the design frequency is set at 7.5 GHz, the length (L2) from the opening portion 5B to the opposite side to the opening portion 5B is set at 2.5 mm(=0.0625λ) or less, and the maximum width (W2) of the second metal 6 at the portion more inside the notch portion 5A than the opening portion 5B is set at 5 mm(=0.125λ); as a result, it is possible to achieve broadening of the band of about 23% at maximum as with the embodiment.

Applied Example 1

Figure 14:
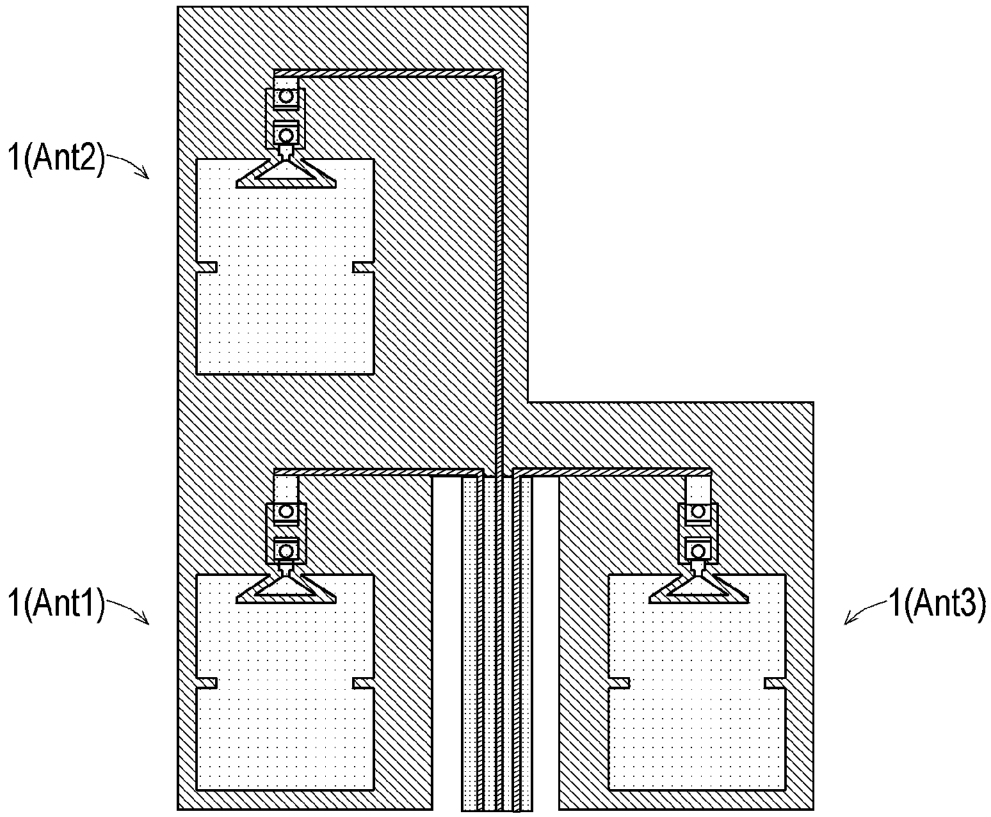
FIG. 14 is a view showing one example of an aspect in which a plurality of antenna devices is arrayed for measuring the distance.

Although the antenna device 1 of the embodiment is also applicable to general radio communication, it can more broaden the band than the antenna device 101 of the comparative example. For this reason, for example, the antenna device 1 of the embodiment is preferable for application to Ultra Wide Band (UWB) handling signals in a broad band. With UWB, for example, high-precision distance measurement (range finding), or the like is also possible. For this reason, as the way in which the antenna device 1 is arranged, such a use form that a plurality of the antenna devices 1 are arrayed vertically and horizontally is conceivable. FIG. 14 is a view showing one example of the form in which the plurality of antenna devices 1 are arrayed for range finding. For example, as shown in FIG. 14, three antenna devices 1 are prepared within the same plane on the same substrate. When the plane is assumed to be, for example, a vertical surface, the two antenna devices 1 (Ant 1 and 2) are arrayed vertically, and the two antenna devices 1 (Ant 1 and 3) are arrayed horizontally. When arrangement is achieved in such a form, it is possible to perform measurement of the angle in the vertical direction and the measurement of the angle in the horizontal direction using the phase of the radio signal incident upon each antenna device 1 from a radio identifier (tag) opposed to the plane, and to identify the direction and the distance in and at which the radio identifier is present.

In order to confirm the characteristic of the distance between the antenna devices 1 when the antenna device 1 capable of more broadening of the band than the antenna device 101 of the comparative example is applied to the distance measurement with UWB, simulation was performed on the case where arrangement is achieved in 3 stages of the distance between the central points of the two antenna devices 1 (Ant 1 and 3) arranged horizontally of the three antenna devices 1 shown in FIG. 14 of 18.75 mm(=λ/2), 12.50 mm(=λ/3), and 9.38 mm(=λ/4). Incidentally, the distance between the central points of the two antenna devices 1(Ant 1 and 2) arranged vertically was fixed at 18.75 mm(=λ/2) because there was no space due to the circumstances under which the feeder line 7 was arranged.

Figure 15A:
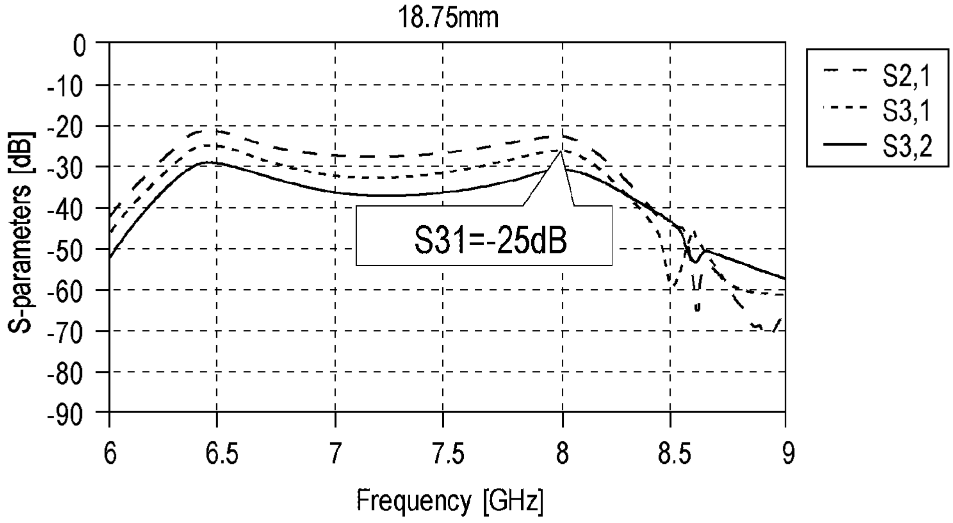
FIG. 15A shows graphs each showing the S parameter when the distance between the antenna devices has been changed.
Figure 15B:
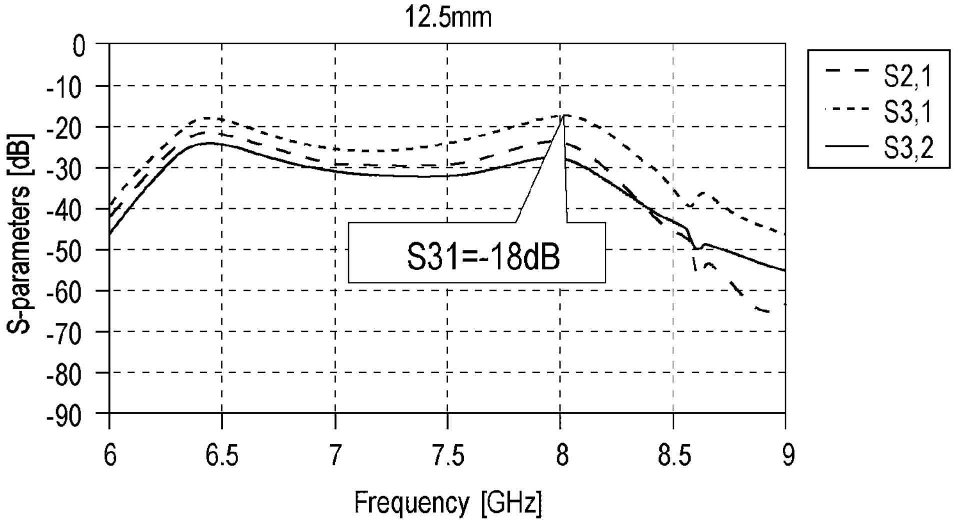
FIG. 15B shows graphs each showing the S parameter when the distance between the antenna devices has been changed.
Figure 15C:
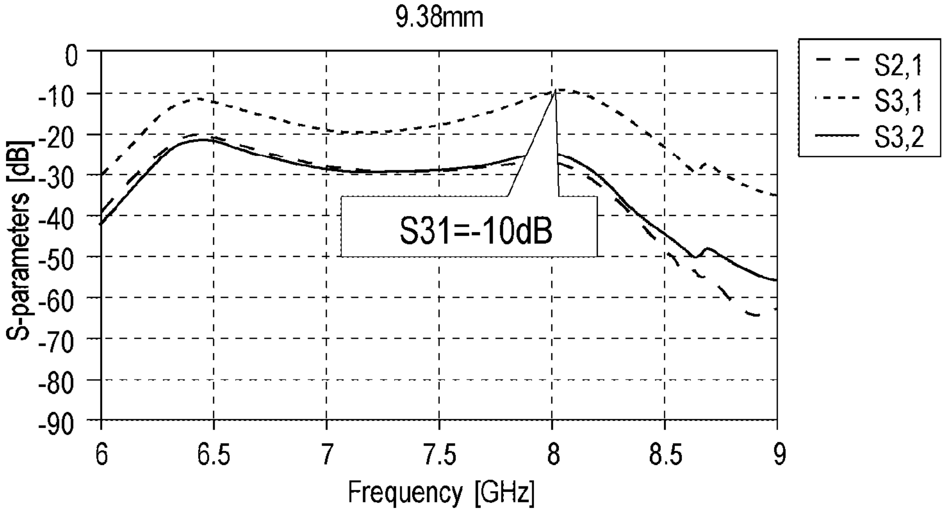
FIG. 15C shows graphs each showing the S parameter when the distance between the antenna devices has been changed.

FIGS. 15A to 15C show graphs each showing the S parameter when the distance between the antenna devices 1 has been changed. As indicated by the graphs of FIGS. 15A to 15C, S31 (S3, 1) indicative of the coupling of the antennas increases from −25 dB to −10 dB as the two antenna devices 1(Ant 1 and 3) approach each other. Practically, a S31 of −9 dB or less does not cause a hindrance. Accordingly, when attention is paid to S31, it can be said that a distance between the central points of the two antenna devices 1(Ant 1 and 3) of 9.38 mm(=λ/4) or more does not cause a problem.

Figure 16A:
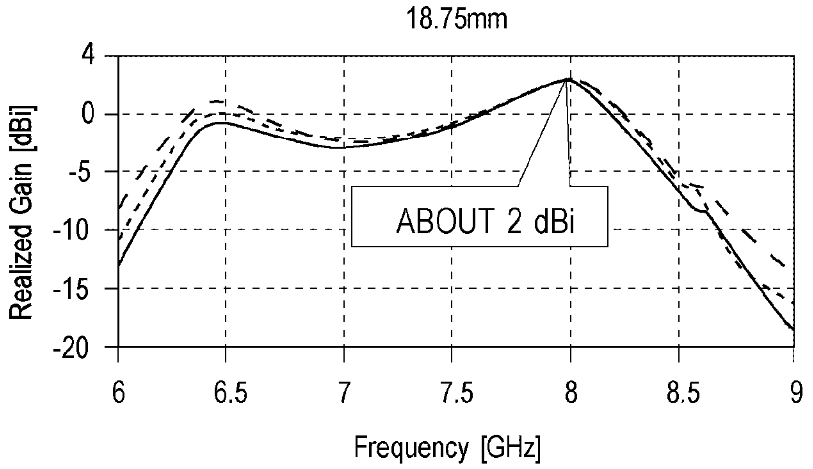
FIG. 16A shows graphs each showing the operating gain when the distance between the antenna devices has been changed.
Figure 16B:
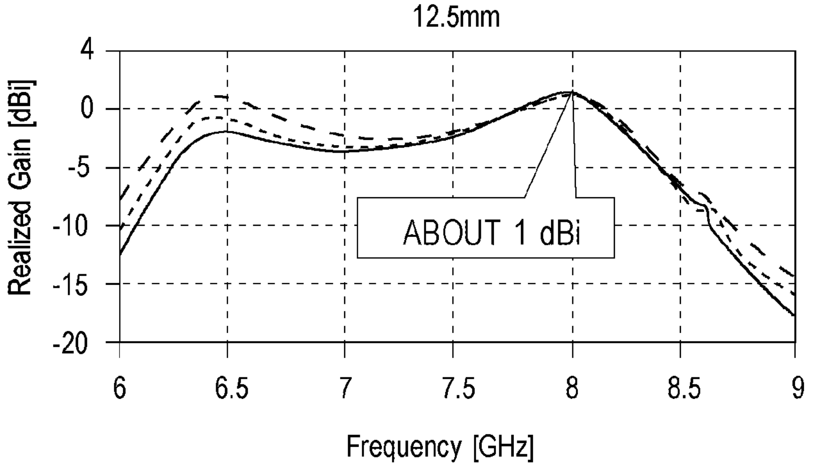
FIG. 16B shows graphs each showing the operating gain when the distance between the antenna devices has been changed.
Figure 16C:
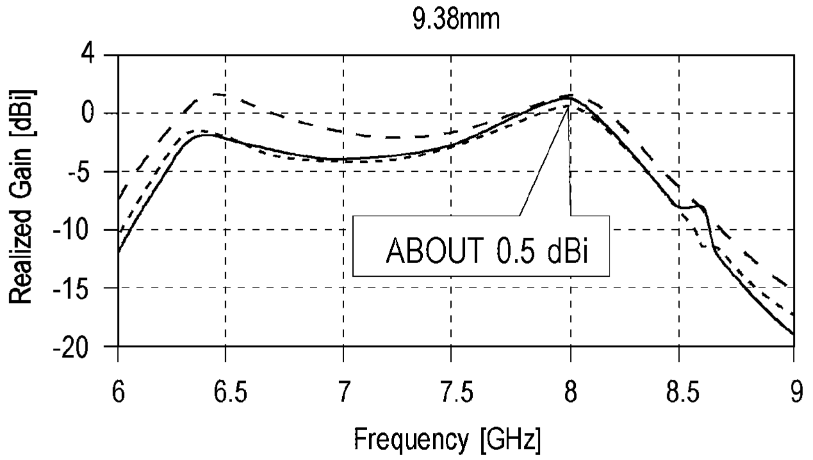
FIG. 16C shows graphs each showing the operating gain when the distance between the antenna devices has been changed.

FIGS. 16A to 16C show graphs each showing the operating gain when the distance between the antenna devices 1 has been changed. As indicated by the graphs of FIGS. 16A to 16C, it is indicated as follows: the gain of the antenna decreases as the two antenna devices 1(Ant 1 and 3) approach each other; and when the distance between the central points of the two antenna devices 1(Ant 1 and 3) is 9.38 mm(=λ/4), the operating gain is reduced to 0.5 dBi. Accordingly, it is understood that the distance between the antenna devices 1 is determined according to the performance requirements of the operating gain with respect to the antenna device 1.

Applied Example 2

Figure 17:
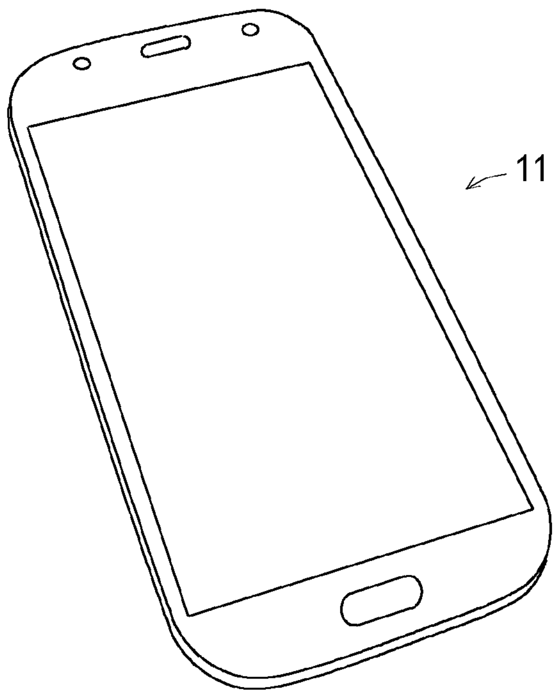
FIG. 17 is a view showing one example of a smartphone.

The embodiments and the modified examples can be appropriately changed. Further, the embodiments and the modified examples are also applicable to various wireless terminals. FIG. 17 is a view showing one examples of a smartphone. For example, the antenna device 1 of the embodiment may be included in a smartphone 11 of one kind of wireless terminals. When the antenna device 1 is applied to the smartphone 11, it becomes possible to perform distance measurement at with high-speed radio communication or UWB, and the like, using the antenna device 1.

The disclosed technology enables broadening of the band of the patch antenna.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna device, comprising:
a metal layer for forming an antenna element in a predetermined planar shape; and
a ground arranged on a lower side of the metal layer,
wherein the metal layer forms:
a first metal forming the planar shape,
a notch portion formed at the first metal, and cutting out a part of an edge of the planar shape,
a second metal being an electromagnetic field coupling element arranged with a predetermined distance spaced from the first metal inside the notch portion, and
a feeder line formed outside the planar shape, and to be connected with the second metal via an opening portion of the notch portion, and
for the second metal, a width at the opening portion is smaller than a maximum width at a portion more inside the notch portion than the opening portion,
wherein the second metal is a metal in a shape of a trapezoid in which a top side of the trapezoid is situated at a portion in a width direction of the opening portion.

2. The antenna device according to claim 1,
wherein for the second metal, a width W1 (mm) at the opening portion satisfies an expression (1):

$$W1 \leq 0.0125 \times \lambda \quad (1)$$

where λ(mm) represents a wavelength at a design frequency of the antenna element.

3. The antenna device according to claim 1,
wherein for the second metal, a maximum width W2 (mm) at the portion more inside the notch portion than the opening portion satisfies an expression (2):

$$W2 \leq 0.125 \times \quad (2)$$

where λ(mm) represents a wavelength at a design frequency of the antenna element.

4. The antenna device according to claim 1,
wherein for the second metal, a length L2 (mm) from the opening portion to an opposite side to the opening portion satisfies an expression (3):

$$L2 \leq 0.0625 \times \lambda \quad (3)$$

where λ(mm) represents a wavelength at a design frequency of the antenna element.

5. The antenna device according to claim 1,
wherein the first metal has a slit at an edge of the planar shape.

6. The antenna device according to claim 1,
wherein the first metal has a slit at a portion inside the planar shape.

7. The antenna device according to claim 1,
wherein for the feeder line, a width of a portion to be connected with the second metal is constant or gradually thins toward the second metal.

8. The antenna device according to claim 1, further comprising a dielectric layer arranged between the metal layer and the ground.

9. The antenna device according to claim 1, wherein a matching circuit is provided in the feeder line.

10. A wireless terminal comprising the antenna device according to claim 1.

* * * * *